United States Patent
Zhang et al.

(10) Patent No.: US 12,452,800 B2
(45) Date of Patent: Oct. 21, 2025

(54) METHOD PERFORMED BY USER EQUIPMENT, AND USER EQUIPMENT

(71) Applicant: Sharp Kabushiki Kaisha, Sakai (JP)

(72) Inventors: Chongming Zhang, Shanghai (CN); Renmao Liu, Shanghai (CN); Fangying Xiao, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 449 days.

(21) Appl. No.: 17/928,635

(22) PCT Filed: May 27, 2021

(86) PCT No.: PCT/CN2021/096323
§ 371 (c)(1),
(2) Date: Nov. 30, 2022

(87) PCT Pub. No.: WO2021/244387
PCT Pub. Date: Dec. 9, 2021

(65) Prior Publication Data
US 2023/0232341 A1 Jul. 20, 2023

(30) Foreign Application Priority Data
Jun. 1, 2020 (CN) .......................... 202010487248.0

(51) Int. Cl.
*H04W 52/36* (2009.01)

(52) U.S. Cl.
CPC ................ *H04W 52/365* (2013.01)

(58) Field of Classification Search
CPC ... H04W 52/365; H04W 76/15; H04W 76/22; H04W 76/27; H04L 5/0098
See application file for complete search history.

(56) References Cited

U.S. PATENT DOCUMENTS 12,010,619 B2 * 6/2024 Zhou ...................... H04W 24/02
12,279,276 B2 * 4/2025 Yi ........................... H04W 24/08
(Continued)

FOREIGN PATENT DOCUMENTS

CN          109391999 A     2/2019

OTHER PUBLICATIONS

3GPP TSG-RAN WG2 Meeting #109bis-e, "Email report of [AT109bis-e][036][DCCA] Fast SCell Activation (OPPO) Email report of [AT109bis-e][036][DCCA] Fast SCell Activation (OPPO)", Apr. 30, 2020 (Year: 2020).*

(Continued)

*Primary Examiner* — Fayyaz Alam
(74) *Attorney, Agent, or Firm* — Keating & Bennett, LLP

(57) ABSTRACT

Provided in the present invention are a method performed by user equipment, and user equipment. The method performed by user equipment is a method in which UE, after receiving a command for activating an SCell, triggers a PHR, the method including the following steps: receiving, by UE, an activation command for activating an SCell; when the UE receives the activation command, determining, by the UE, the state of the SCell; and when the UE determines that the SCell is in an activated state before the activation command is received, determining, by the UE, the type of an active BWP of the SCell; and when the UE determines that the type of the active BWP is a non-dormant BWP, triggering, by the UE, a PHR.

2 Claims, 3 Drawing Sheets

(56) References Cited

U.S. PATENT DOCUMENTS

| | | | |
|---|---|---|---|
| 2020/0244410 A1* | 7/2020 | Kim | H04L 5/0098 |
| 2021/0203468 A1* | 7/2021 | Yi | H04W 72/0453 |
| 2021/0243763 A1* | 8/2021 | Zhou | H04W 72/23 |
| 2022/0116923 A1* | 4/2022 | Kim | H04L 5/0098 |

OTHER PUBLICATIONS

Official Communication issued in International Patent Application No. PCT/CN2021/096323, mailed on Aug. 20, 2021.
Ericsson et al., "New WID on DC and CA enhancements (NR_DCCA_Enh)", 3GPP TSG-RAN #80, RP-181469, Jun. 11-14, 2018, 5 pages.
OPPO, "Email report of [AT109bis-e][036][DCCA] Fast SCell Activation (OPPO)", 3GPP TSG-RAN WG2 Meeting #109bis-e, R2-2004122, Apr. 20-30, 2020, 20 pages.
3rd Generation Partnership Project; Technical Specification Group Radio Access Network; NR; Medium Access Control (MAC) protocol specification (Release 16); 3GPP TS 38.321 V16.0.0, Mar. 2020, pp. 1-141.
OPPO et al., "Corrections on dormant BWP operation", 3GPP TSG-RAN WG2 Meeting #110, R2-2004582, Jun. 1-12, 2020, 8 pages.
Vivo, "New PHR trigger for dormancy SCell", 3GPP TSG-RAN WG2 Meeting #110, R2-2004500, Jun. 1-12, 2020, 2 pages.

* cited by examiner

201

UE receives an activation command for activating an SCell

202

The UE determines the state of the SCell, and when the UE determines that the SCell is in an activated state before the activation command is received, the UE determines the type of an active BWP of the SCell and the type of a BWP for first activation of the SCell

203

When the UE determines that the type of the active BWP is different from the type of the BWP for first activation of the SCell, the UE activates the BWP for first activation of the SCell

FIG. 2

METHOD PERFORMED BY USER EQUIPMENT, AND USER EQUIPMENT

TECHNICAL FIELD

The present invention relates to the technical field of wireless communications. More specifically, the present invention relates to a method performed by user equipment, and corresponding user equipment.

BACKGROUND

With the rapid growth of mobile communications and great progress of technology, the world will move toward a fully interconnected network society where anyone or anything can acquire information and share data anytime and anywhere. To meet the requirements on enhanced mobile broadband services and the communication requirements on massive Internet of Things terminals, researches on new-generation communication technology (5G) are carried out to facilitate technical enhancements for users in dual-connectivity and multi-connectivity (RP-181469: New WID on DC and CA enhancements).

User equipment (UE) may be configured with one or a plurality of secondary cells (SCells). Each SCell can be activated or deactivated. For an activated SCell, the cell always operates on an active BWP thereof, and the active BWP may be a non-dormant BWP or a dormant BWP.

When the UE receives an SCell activation command for activating a certain SCell, the SCell may be in an activated state or a deactivated state. If the SCell is in a deactivated state before the SCell activation command is received, the UE can activate a pre-configured BWP as a BWP that operates after the SCell is activated for the first time; but if the activated SCell is already in an activated state and has an active BWP before the SCell activation command is received, how the UE handles the activation command is an issue to be resolved.

SUMMARY

Provided in the present invention is a solution to the following issue, that is, provided is a solution to the issue of how to process a received SCell activation command for activating an SCell when the SCell is already in an activated state.

According to one aspect of the present invention, provided is a method performed by user equipment, in which user equipment (UE), after receiving a command for activating a secondary cell (SCell), triggers a power headroom report (PHR), the method comprising the following steps:

receiving, by UE, an activation command for activating an SCell;

when the UE receives the activation command, determining the state of the SCell; and when the UE determines that the SCell is in an activated state before the activation command is received, determining, by the UE, the type of an active bandwidth part (BWP) of the SCell; and when the UE determines that the type of the active BWP is a non-dormant BWP, triggering, by the UE, a PHR.

In the foregoing method performed by user equipment, preferably, when the UE determines that the type of the active BWP is a dormant BWP, the UE does not trigger the PHR.

According to another aspect of the present invention, further provided is a method performed by user equipment, in which user equipment (UE), after receiving a command for activating an SCell, activates a BWP, the method comprising the following steps:

receiving, by UE, an activation command for activating an SCell;

when the UE receives the activation command, determining the state of the SCell; and when the UE determines that the SCell is in an activated state before the activation command is received, determining, by the UE, the type of an active BWP of the SCell and the type of a BWP for first activation of the SCell; and when the UE determines that the type of the active BWP is different from the type of the BWP for first activation of the SCell, activating, by the UE, the BWP for first activation of the SCell.

In the foregoing method performed by user equipment, preferably, the UE may determine that the type of the active BWP is different from the type of the BWP for first activation of the SCell in the following cases:

when the UE determines that the type of the active BWP is a non-dormant BWP, and the type of the BWP for first activation of the SCell is a dormant BWP;

or, when the UE determines that the type of the active BWP is a dormant BWP, and the type of the BWP for first activation of the SCell is a non-dormant BWP.

In the foregoing method performed by user equipment, preferably, the method may further comprise:

when the UE determines that the type of the active BWP is the same as the type of the BWP for first activation of the SCell, and both are non-dormant BWPs, triggering, by the UE, the PHR.

According to another aspect of the present invention, user equipment is provided, comprising:

a processor; and a memory storing instructions, wherein the instructions, when run by the processor, cause the user equipment to perform the method described above.

The method performed by user equipment and the corresponding user equipment involved in the present disclosure enable UE to correctly process a received SCell activation command.

BRIEF DESCRIPTION OF THE DRAWINGS

FIG. 2 shows a flowchart of a method 200 applied to user equipment according to an embodiment of the present invention.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
eLTE Enhanced Long Term Evolution
E-UTRAN: Evolved Universal Terrestrial Radio Access Network
DC: Dual-Connectivity
MC: Multi-Connectivity
Gnb: a base station node which provides UE with NR user plane and control plane protocol stacks and is connected to a 5G core network
Enb: a base station node which provides UE with E-UTRAN user plane and control plane protocol stacks and is connected to an EPC core network
Ng-enb: a base station node which provides UE with E-UTRAN user plane and control plane protocol stacks and is connected to a 5G core network
SRB: Signaling Radio Bearer
DRB: Data Radio Bearer
Split SRB: Split Signaling Radio Bearer
MAC CE: MAC Control Element
SRS: Sounding Reference Signal
CSI: Channel State Information
PDCCH: Physical Downlink Control Channel
PUCCH: Physical Uplink Control Channel
RRC: Radio Resource Control layer
DCI: Downlink Control Information
PHR: Power Headroom Report
SCell: Secondary Cell
BWP: Bandwidth Part
UL-SCH: Uplink Shared Channel
DL-SCH: Downlink Shared Channel
RACH: Random Access Channel SCell Activation Command In the prior art, an SCell activation/deactivation MAC CE is defined, and the MAC CE carries one or a plurality of bytes. Each bit in a byte corresponds to an SCell. When the bit is set to 0, it indicates deactivating the corresponding SCell, and when the bit is set to 1, it indicates activating the corresponding SCell.

When the UE receives the MAC CE, the UE can process, according to the value of each bit, the state of an SCell corresponding thereto, that is, whether the UE is to activate the SCell or to deactivate the SCell.

The SCell activation command may also be an RRC reconfiguration message. The message carries the SCell and a state information element sCellState corresponding thereto. When the value of the information element is set to be activated, it indicates activating the corresponding SCell.

In addition to this, there may be other ways to activate the SCell, and no additional description is made herein. The SCell activation command mentioned below may include, but is not limited to, the aforementioned SCell activation/deactivation MAC CE and RRC reconfiguration message.

Figure 1:
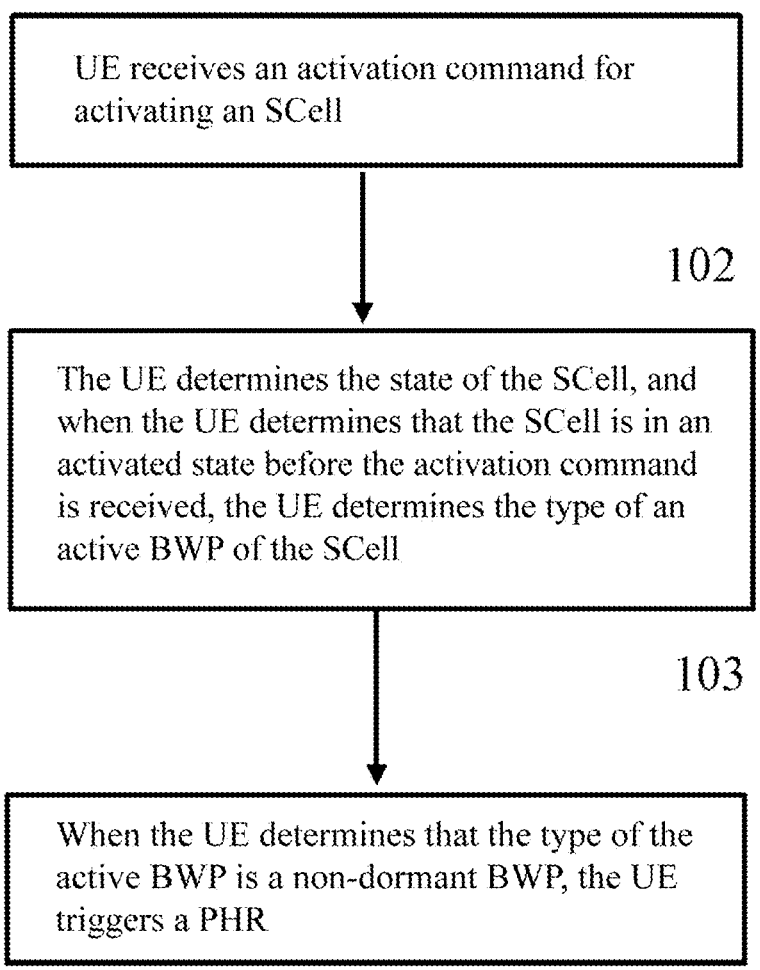
FIG. 1 shows a flowchart of a method 100 applied to user equipment according to an embodiment of the present invention.

FIG. 1 shows a flowchart of a method 100 applied to user equipment according to an embodiment of the present invention. In step S101, user equipment (UE) receives an SCell activation command. In step S102, the UE determines the state of an SCell; and when the UE determines that the SCell is in an activated state before the activation command is received, the UE determines the type of an active BWP of the SCell. In step S103, when the UE determines that the type of the active BWP is a non-dormant BWP, the UE triggers a PHR FIG. 2 shows a flowchart of a method 200 applied to user equipment according to an embodiment of the present invention. In step S201, user equipment (UE) receives an SCell activation command. In step S202, when the UE determines that the SCell is in an activated state before the activation command is received, the UE determines the type of an active BWP of the SCell and the type of a BWP for first activation of the SCell. In step S103, when the UE determines that the type of the active BWP is different from the type of the BWP for first activation of the SCell, the UE activates the BWP for first activation of the SCell.

Specific embodiments of the present invention are described in detail below. In addition, as described above, the embodiments of the present invention are exemplary descriptions for facilitating understanding of the present invention, and are not intended to limit the present invention.

Embodiment 1

This embodiment provides a method performed by user equipment that receives a command for activating an SCell, the method including:

Step 1: UE receives an activation command for activating an SCell.

This command may be the SCell activation/deactivation MAC CE mentioned above, or may be an RRC reconfiguration message carrying information indicating an SCell state. This command is used to activate one or a plurality of SCells. Herein activation of one SCell is used as an example. If a plurality of SCells are activated by one activation command, the UE can perform operations on each SCell separately.

Step 2: The UE determines the state of the SCell.

The state herein mainly refers to whether the state of the SCell is activated or deactivated before the UE receives the activation command, or, before the activation command is received, whether the SCell has received an activation command and has been activated, or has received a deactivation command and has been deactivated.

When the UE determines that the SCell is activated or is in an activated state before the activation command is received, the UE continues to determine the type of an active BWP of the activated SCell.

Herein, the "type of the BWP" mainly refers to whether the BWP is a dormant BWP or a non-dormant BWP. The UE may perform one or a plurality of the following operations according to the determination result:

Operation 1.1: When the UE determines that the active BWP of the SCell is a dormant BWP, the UE does not trigger a PHR. Optionally, the UE may also perform one or a plurality of the following operations:
  not performing PDCCH monitoring on the BWP;
  not performing PDCCH monitoring for the BWP;
  not receiving a downlink shared channel (DL-SCH) on the BWP;
  performing a CSI measurement for the BWP, if configured;
  stopping any uplink (UL) transmission;
  suspending any configured uplink grant Type 1 associated with the SCell; and
  clearing any configured uplink grant Type 2 associated with the SCell;

Operation 1.2: When the UE determines that the active BWP of the SCell is a non-dormant BWP, the UE triggers the PHR. Optionally, the UE performs one or a plurality of the following operations:

performing CSI reporting for the SCell;
performing PDCCH monitoring on the SCell;
performing PDCCH monitoring for the SCell; and
performing PUCCH transmission on the SCell, if configured.

The triggering the PHR herein means triggering a PHR procedure, and operations that need to be performed when a PHR is triggered are defined in the prior art. When a PHR is triggered, if there are available uplink resources, the UE will acquire a corresponding uplink carrier power headroom value, and generate and transmit a PHR MAC CE carrying the power headroom value.

In addition to operation 1.1 and operation 1.2, preferably, the UE may perform operation 1.3 regardless of the determination result.

Operation 1.3: The UE starts or restarts a timer sCellDeactivationTimer associated with the SCell.

Operation 1.3 may be performed before operation 1.1 or operation 1.2 is performed, or performed before the type of the BWP is determined in operation 1.2.

Since the operations of the UE performing the determination and obtaining the determination result can be simultaneously performed, and no specific execution sequence is required, another implementation method of the above solution may be:

First, the UE receives an activation command for activating an SCell; then, for case 1: the SCell is activated or is in an activated state before the activation command is received, and the UE performs operations according to the type of an active BWP of the activated SCell. Specific operations can include:

For case 1.1: the active BWP of the SCell is a dormant BWP, and the UE does not trigger the PHR, and optionally performs the optional operations described in operation 1.1.

For case 1.2: the active BWP of the SCell is a non-dormant BWP, the UE triggers the PHR, and optionally performs the optional operations described in operation 1.2.

In addition, the UE may start or restart the timer sCellDeactivationTimer associated with the SCell when the UE receives the SCell activation command, or perform said operation when case 1 or case 1.1 or case 1.2 occurs.

Embodiment 2

This embodiment provides a method performed by user equipment (UE) that receives a command for activating an SCell, including:

Step 1: The UE receives an activation command for activating an SCell.

This command may be the SCell activation/deactivation MAC CE mentioned above, or may be an RRC reconfiguration message carrying information indicating an SCell state. This command is used to activate one or a plurality of SCells. Herein activation of one SCell is used as an example. If a plurality of SCells are activated by one activation command, the UE can perform operations on each SCell separately.

Step 2: The UE determines the state of the SCell.

The state herein mainly refers to whether the state of the SCell is activated or deactivated before the UE receives the activation command, or, before the activation command is received, whether the SCell has received an activation command and has been activated, or has received a deactivation command and has been deactivated.

When the UE determines that the SCell is activated or is in an activated state before the activation command is received, the UE continues to determine the type of an active BWP of the activated SCell and the type of a BWP associated with the SCell and used for first activation. Optionally, the UE further determine the relationship between the two types, that is, whether the two types are the same or different.

The UE may then perform one or a plurality of the following operations:

Operation 2.1: When the UE determines that the active BWP is a non-dormant BWP and the first active BWP of the SCell is also a non-dormant BWP, that is, the active BWP is of the same type as that of the first active BWP and both are non-dormant BWPs, then the UE can trigger a PHR. Optionally, the UE performs one or a plurality of the following:
performing CSI reporting for the SCell;
performing PDCCH monitoring on the SCell;
performing PDCCH monitoring for the SCell; and
performing PUCCH transmission on the SCell, if configured.

Operation 2.2: When the UE determines that the active BWP is a non-dormant BWP and the first active BWP of the SCell is a dormant BWP, that is, the active BWP is of a different type from that of the first active BWP, then the UE activates the first active BWP associated with the SCell, including activating a first active uplink BWP and a first active downlink BWP, which specifically means activating a BWP corresponding to a BWP ID indicated by the first active uplink/downlink BWP. Optionally, when the first active BWP is a dormant BWP, the UE performs one or a plurality of the following:
stopping a bandwidth part deactivation timer bwp-InactivityTimer associated with the serving cell; and
not triggering the PHR;
not performing PDCCH monitoring on the BWP;
not performing PDCCH monitoring for the BWP;
not receiving a downlink shared channel (DL-SCH) on the BWP;
performing a CSI measurement for the BWP, if configured;
stopping any uplink (UL) transmission;
suspending any configured uplink grant Type 1 associated with the SCell; and
clearing any configured uplink grant Type 2 associated with the SCell.

Operation 2.3: When the UE determines that the active BWP is a dormant BWP and the first active BWP of the SCell is a non-dormant BWP, that is, the active BWP is of a different type from that of the first active BWP, then the UE may activate the first active BWP associated with the SCell, including activating the first active uplink BWP and the first active downlink BWP, which specifically means activating the BWP corresponding to the BWP ID indicated by the first active uplink/downlink BWP. Optionally, when the first active BWP is a non-dormant BWP, the UE performs one or a plurality of the following:
triggering the PHR
performing CSI reporting for the SCell;
performing PDCCH monitoring on the SCell;
performing PDCCH monitoring for the SCell;
performing PUCCH transmission on the SCell, if configured;
if there is a suspended configured grant Type 1 associated with the SCell, initializing or re-initializing the suspended configured grant Type 1 associated with the SCell.

Operation 2.4: When the UE determines that the active BWP is a dormant BWP and the first active BWP of the SCell is a dormant BWP, that is, the active BWP is of the same type as that of the first active BWP and both are dormant BWPs, then the UE may perform no operation, or may optionally perform one or a plurality of the following operations:

not performing PDCCH monitoring on the BWP;
    not performing PDCCH monitoring for the BWP;
    not receiving the downlink shared channel (DL-SCH) on the BWP;
    performing a CSI measurement for the BWP, if configured;
    stopping any uplink (UL) transmission; and
    not triggering the PHR.

Another implementation method of the above solution may be as follows:

First, the UE receives an activation command for activating an SCell; then, for case 2: the SCell is activated or is in an activated state before the activation command is received, and the UE performs operations according to the type of an active BWP belonging to the activated SCell and the type of a BWP associated with the SCell and used for first activation. Optionally, the UE may also perform operations according to the relationship between the two types, that is, whether the two types are the same or different. Specific operations may include:

For case 2.1: the active BWP is a non-dormant BWP and the first active BWP of the SCell is also a non-dormant BWP, that is, the active BWP is of the same type as that of the first active BWP and both are non-dormant BWPs, then the UE can trigger the PHR. Optionally, the UE performs the optional operations described in operation 2.1.

For case 2.2: the active BWP is a non-dormant BWP and the first active BWP of the SCell is a dormant BWP, that is, the active BWP is of a different type from that the first active BWP, then the UE activates the first active BWP associated with the SCell, including activating the first active uplink BWP and activating the first active downlink BWP, which specifically means activating the BWP corresponding to the BWP ID indicated by the first active uplink/downlink BWP, and optionally, when the first active BWP is a dormant BWP, the UE performs the optional operations described in operation 2.2.

For case 2.3: the active BWP is a dormant BWP and the first active BWP of the SCell is a non-dormant BWP, that is, the active BWP is of a different type from that of the first active BWP, then the UE can activate the first active BWP associated with the SCell, including activating the first active uplink BWP and the first active downlink BWP, which specifically means activating the BWP corresponding to the BWP ID indicated by the first active uplink/downlink BWP, and optionally, when the first active BWP is a non-dormant BWP, the UE performs the optional operations described in operation 2.3.

For case 2.4: the active BWP is a dormant BWP and the first active BWP of the SCell is a dormant BWP, that is, the active BWP is of the same type as that of the first active BWP and both are dormant BWPs, then the UE may perform no operation, or may optionally perform the optional operations described in operation 2.4.

In addition, the UE may also start or restart the timer sCellDeactivationTimer associated with the SCell when the UE receives the SCell activation command, or performs said operation when case 2, case 2.1, case 2.2, case 2.3, or case 2.4 occurs.

Embodiment 3

On the basis of Embodiment 1 or Embodiment 2, that is, after UE receives an SCell deactivation command and determines the state of an SCell, if the UE determines that the state of the SCell is: the SCell is deactivated or is in a deactivated state before the activation command is received, then the UE subsequently determines the type of a BWP associated with the SCell and used for first activation.

When an SCell is activated from a deactivated state, or is in a deactivated state before the activation command is received, then once the SCell is activated, the SCell always operates on a pre-configured BWP, or always activates a pre-configured BWP. This preconfigured BWP may be referred to as a BWP for first activation or the first active BWP. Specifically, the first active BWP is a BWP ID, and when a deactivated SCell receives a command for activating the SCell, the UE activates the BWP corresponding to the BWP ID.

Since BWPs are divided into uplink BWPs and downlink BWPs, BWPs used for first activation are also divided into uplink BWPs for first activation and downlink BWPs for first activation. The BWP used by the UE for determining the BWP for first activation associated with the SCell is preferably a downlink BWP, that is, the UE determines the type of the downlink BWP for first activation, and may then perform the following operation 3.1 or operation 3.2.

Operation 3.1: When the UE determines that the first active BWP of the SCell is a non-dormant BWP, then the UE triggers a PHR, and optionally performs one or a plurality of the following:

performing CSI reporting for the SCell;
    performing PDCCH monitoring on the SCell;
    performing PDCCH monitoring for the SCell;
    performing PUCCH transmission on the SCell, if configured.

Operation 3.2: When the UE determines that the first active BWP of the SCell is a dormant BWP, then the UE may not trigger the PHR, and optionally performs one or a plurality of the following operations:

not performing PDCCH monitoring on the BWP;
    not performing PDCCH monitoring for the BWP;
    not receiving a downlink shared channel (DL-SCH) on the BWP;
    performing a CSI measurement for the BWP, if configured;
    stopping any uplink (UL) transmission;
    suspending any configured uplink grant Type 1 associated with the SCell; and
    clearing any configured uplink grant Type 2 associated with the SCell.

In addition to operation 3.1 and operation 3.2, preferably, regardless of the determination result, the UE can perform operation 1.3 described in Embodiment 1.

Operation 1.3 may be performed before or at the same time as operation 3.1 or operation 3.2, or before or at the same time as the second step of determining the type of the BWP in Embodiment 1 or 3.

Another implementation method of the above solution may be as follows:

First, the UE receives an activation command for activating an SCell; then, for case 3: when the SCell is deactivated or is in a deactivated state before the activation command is received, the UE performs operations according to the type of the BWP (the first active BWP) associated with the SCell and used for first activation. Specific operations can include:

For case 3.1: the first active BWP of the SCell is a non-dormant BWP, the UE does not trigger the PHR, and optionally performs the optional operations described in operation 3.1.

For case 3.2: the first active BWP of the SCell is a dormant BWP, the UE triggers the PHR, and optionally performs the optional operations described in operation 3.2.

In addition, the UE may start or restart a timer sCellDeactivationTimer associated with the SCell when the UE receives the SCell activation command, or perform said operation when case 3, case 3.1, or case 3.2 occurs.

Embodiment 4

Since a secondary cell (SCell) is a serving cell, the "activating an SCell" mentioned in Embodiments 1-3 may be referred to as activating a serving cell. When a cell is activated, activating a serving cell includes at least the following operations:
activating any bandwidth part (BWP) associated with the serving cell as active BWP.
When a serving cell is activated, the features thereof are as follows:
an SRS may be transmitted on the serving cell;
CSI reporting may be performed for the serving cell (SCell);
if the serving cell is configured with an uplink channel, then transmission may be performed on the uplink channel (UL-SCH) of the serving cell (SCell);
if the serving cell is configured with a random access channel (RACH), then transmission can be performed on the random access channel of the serving cell (SCell);
PDCCH monitoring is performed on the serving cell (SCell);
PDCCH monitoring is performed for the serving cell (SCell); and
if the serving cell is configured with a PUCCH, then PUCCH transmission may be performed on the SCell.
It may be considered that a serving cell having the above features may be referred to as an activated cell or a cell in an activated state.

Embodiment 5

The "deactivating an SCell" mentioned in Embodiments 1-3 may be referred to as deactivating a serving cell.

Deactivating a serving cell includes at least the following operations:
stopping a bandwidth part deactivation timer bwp-InactivityTimer associated with the serving cell; and
deactivating any active bandwidth part (BWP) associated with the serving cell.
When a serving cell is deactivated, the serving cell has at least one or more of the following features:
no SRS is transmitted on the serving cell (SCell);
no CSI reporting is performed for the serving cell (SCell);
no transmission is performed on an uplink channel (UL-SCH) of the serving cell (SCell);
no transmission is performed on a random channel (RACH) of the serving cell (SCell);
no PDCCH monitoring is performed on the serving cell (SCell);
no PDCCH monitoring is performed for the serving cell (SCell); and
no PUCCH transmission is performed on the serving cell (SCell).
It may be considered that a serving cell having the above features may be referred to as a deactivated cell or a cell in a deactivated state.

Embodiment 6

The non-dormant BWP mentioned in Embodiments 1-3 means that configurations for the BWP does not include PDCCH configurations, or does not include valid PDCCH configurations, that is, the PDCCH configurations are absent. Since these PDCCH configurations are used to perform PDCCH monitoring, so that if a dormant BWP does not include the PDCCH configurations, the UE does not need to monitor a corresponding PDCCH on the dormant BWP.

Correspondingly, the non-dormant BWP means that configurations for the BWP includes PDCCH configurations or valid PDCCH configurations for PDCCH monitoring.

Figure 3:
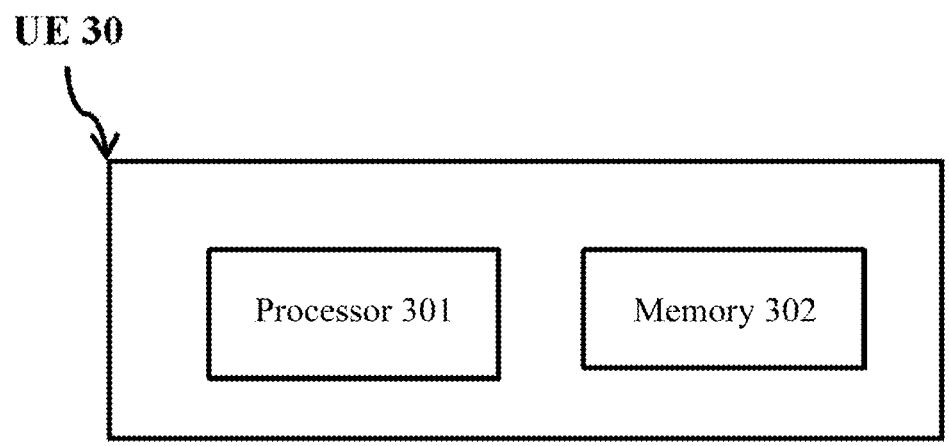
FIG. 3 shows a block diagram of user equipment 30 according to an embodiment of the present invention.

FIG. 3 is a schematic structural block diagram of user equipment according to the present invention. As shown in FIG. 3, user equipment (UE) 30 includes a processor 301 and a memory 302. The processor 301 may include, for example, a microprocessor, a microcontroller, an embedded processor, and the like. The memory 202 may include, for example, a volatile memory (such as a random access memory (RAM)), a hard disk drive (HDD), a non-volatile memory (such as a flash memory), or other memories. The memory 302 stores program instructions. The instructions, when run by the processor 301, can perform the above method performed by user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment (UE), comprising:
a processor; and
a memory in electronic communication with the processor, wherein instructions stored in the memory are executable to:
receive a Secondary Cell (SCell) Activation/Deactivation MAC Control Element (MAC CE) for the SCell, the SCell Activation/Deactivation MAC CE activating the SCell,
determine whether the SCell is activated or deactivated before the UE receives the SCell Activation/Deactivation MAC CE, and
in a case that the SCell is activated before the UE receives the SCell Activation/Deactivation MAC CE, determine whether an active Bandwidth Part (BWP) of the SCell is a dormant BWP or a non-dormant BWP, the active BWP being activated before the UE receives the SCell Activation/Deactivation MAC CE,
wherein
in a case that the active BWP of the SCell is a dormant BWP, the UE does not trigger a Power Headroom Report (PHR); and
in a case that the active BWP of the SCell is not the dormant BWP, the UE triggers the PHR.

2. A method performed by a user equipment (UE), comprising:
receiving a Secondary Cell (SCell) Activation/Deactivation MAC Control Element (MAC CE) for the SCell, the SCell Activation/Deactivation MAC CE activating the SCell;
determining whether the SCell is activated or deactivated before the UE receives the SCell Activation/Deactivation MAC CE; and
in a case that the SCell is activated before the UE receives the SCell Activation/Deactivation MAC CE, determining whether an active bandwidth part (BWP) of the SCell is a dormant BWP or a non-dormant BWP, the active BWP being activated before the UE receives the SCell Activation/Deactivation MAC CE,
wherein
in a case that the active BWP of the SCell is a dormant BWP, the UE does not trigger a Power Headroom Report (PHR); and
in a case that the active BWP of the SCell is not the dormant BWP, the UE triggers the PHR.

* * * * *